W. W. SHIRLEY.
ADJUSTABLE GRIPPING TOOL.
APPLICATION FILED MAR. 5, 1920.

1,347,764. Patented July 27, 1920.

Witness:
R. F. Dilworth

Inventor:
W. W. Shirley,
by F. N. Barber,
attorney.

UNITED STATES PATENT OFFICE.

WILLIAM W. SHIRLEY, OF PITTSBURGH, PENNSYLVANIA.

ADJUSTABLE GRIPPING-TOOL.

1,347,764.  Specification of Letters Patent.   Patented July 27, 1920.

Application filed March 5, 1920. Serial No. 363,620.

*To all whom it may concern:*

Be it known that I, WILLIAM W. SHIRLEY, a citizen of the United States, residing at Pittsburgh, in the county of Allegheny and State of Pennsylvania, have invented new and useful Improvements in Adjustable Gripping-Tools, of which the following is a specification.

My invention relates to a pivoted tool having a flexible gripping member and adapted to hold various devices frictionally or to serve as a friction wrench.

It is the principal object of this invention to provide for a pivoted tool having a flexible looped gripping member, an adjusting means of novel structure whereby the said member may be readily enlarged or contracted to correspond to the different sizes of articles to be gripped, another object being to arrange the parts of the tool so that, when the levers are opened or spread apart, portions of the flexible gripping member will be projected from the lever, thereby enlarging the loop of the said member, and when the levers are closed, the said portions are drawn into the levers, thereby contracting the loop. Other objects appear hereinafter.

Figure 1:
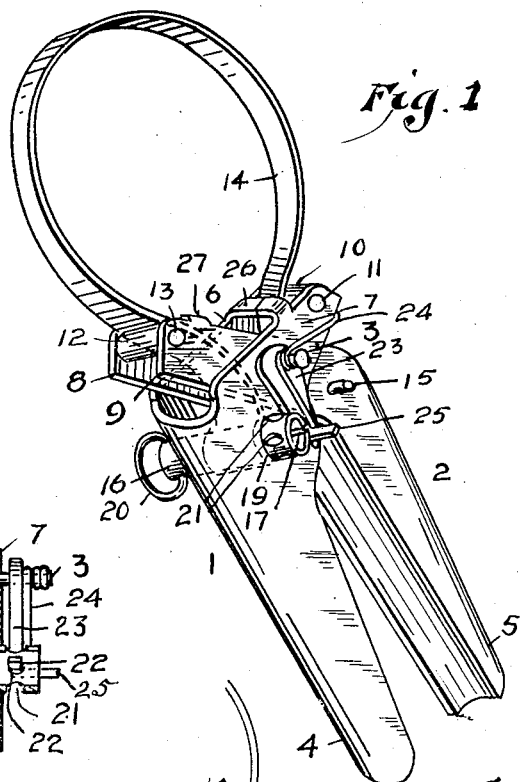
Figure 3:
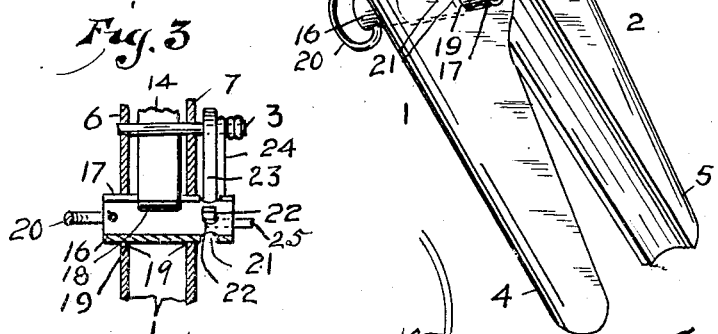
Figure 2:
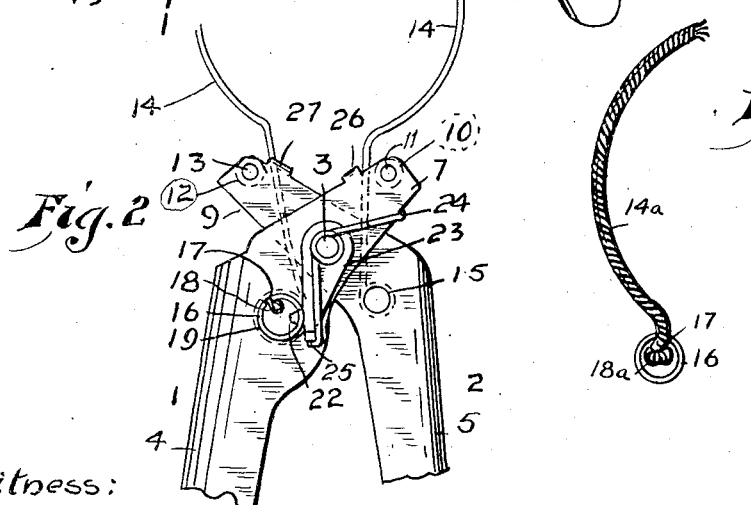

Referring to the accompanying drawing, Figure 1 is a perspective view of one form of my invention; Fig. 2, a side elevation of the central portion of Fig. 1; Fig. 3, a sectional detail, the section being taken longitudinally of the reel or drum; and Fig. 4, a modified detail showing an end view of the reel or drum and a portion of a cable gripping device connected thereto.

Referring first to Figs. 1, 2, and 3, 1 and 2 designate a pair of crossed levers pivoted between their ends on the pin 3. The levers have the handle portions 4 and 5 on one side of the pivot and jaw-portions on the other side thereof. The levers are preferably made from sheet metal bent to U-shape from the outer ends of the handle portions to points a short distance beyond the pivot 3. From these points the levers are continued merely as pair of parallel members or jaws 6, 7, and 8, 9. The lever 2 is made a little thinner than the lever 1 so that the members 8, 9 may pass between the members 6, 7, the member 6 being close to or in contact with the member 8, and the member 7 being close to or in contact with the member 9. The members 6, 7 have between their outer ends the spacing cylinder or jaw-member 10 held in place by the pin 11, and the members 8 and 9 have a similar spacing cylinder or jaw member 12 held in place by the pin 13.

14 is a flexible gripping member which may be of any suitable material and have any suitable cross-section, but I have shown it as a flat strip of metal. One end of the member 14 is secured in any suitable manner to the pin 15 which extends transversely through the lever 2 a short distance below the pivot 3, but its precise location is not important. The other end of the member 14 is connected to the reel or drum 16 parallel with the pivot 3 and rotatable in bearings or openings 19 in the opposing portions of the lever 1 a short distance below the pivot 3. The reel 16 is preferably a cylinder formed by bending a piece of sheet-metal, the cylinder being preferably left unclosed, whereby a slot 17 is left longitudinally of the reel for the insertion of the end of the gripping member 14. The end of the member 14 is rolled up or otherwise provided with an enlargement 18 too large to pass through the slot 17. The enlargement 18 of the member 14 is held opposite the openings 19 and the reel is then pushed into the openings 19, the slot 17 receiving the member 14 just above the enlargement. One end of the reel has the pivoted bail-like handle 20 secured to holes therein, the handle serving as a stop to prevent the reel from passing entirely through the adjacent opening 19. The remaining end of the reel has just at the outside of the handle 1 a series of ratchet openings 21 to receive the tooth 22 of the pawl 23 pivoted on the pivot 3. A spring 24 wound on the pivot 3 and having one end caught under the member 7 and the other end pressing against the finger 25 on the pawl serves to give constant pressure on the pawl toward the reel. The finger 25 projects out at an angle to the lever 1 so that it may be grasped to move the pawl tooth out of an opening 21.

The member 14 is held close to the jaw member 10 by the spreader 26 which is preferably made by bending down integral projections from the members 6 and 7 until the projections meet. The member 14 is between the jaw member 10 and the spreader 26. The member 14 is also held between the member 12 and the spreader 27 which is similar to the spreader 26.

The member 14 forms a loop with the portions between the jaw-members and the spreaders capable of being contracted by the jaw members and of being spread apart by the spreaders. The loop is placed over any suitable object to be held or rotated, and the handle members 4 and 5 are then moved toward each other causing the jaw-members 10 and 12 to contract the loop so as to make it grip the object firmly, which may then be held, carried from one place to another, or rotated, as the case may require. If the loop is too large, it may readily be made smaller by turning the reel or drum 16 by the handle 20, the pawl tooth 22 automatically coming out of one hole 21 and entering the next to arrive beneath it. If the loop is too small, it may be made larger by engaging the finger 25 and moving the pawl back so as to remove the tooth 22 from an opening 21, and turning the reel so as to unwind some of the member 14.

It is to be noted from Fig. 2 that, if the handles 4 and 5 be spread apart farther, the distance between the pin 15 and the jaw member 10, and the distance between the reel 16 and the jaw member 12 decreases, which causes an increase in the size of the loop. When the handles are spread, portions of the member 14 between the jaw-members appear to have been projected or fed outwardly from the ends of the levers. In another aspect of this operation the jaw members 10 and 12 appear to slide down on the portions of the member 14 within the levers, thereby exposing more of it beyond the ends of the levers. The lengthening and shortening of the loop is due to the location of the pin 15 and the reel 16 on the opposite side of the pivot 3 from the loop, or the body of the flexible member 14. It is also to be noted that while each terminal portion of the loop is moved laterally by one lever, the end of each terminal portion is secured to the other lever, and that the pivot 3 is between the points of attachment of the ends of the loops and the points where the terminal portions of the loop are engaged by the jaw members 10 and 12. These features cause the automatic addition of a part of the terminal portions of the member 14 to the loop while the levers are being opened, and the withdrawal of a part of the terminal portions of the member 14 from the loop while the levers are being closed. The loop is enlarged not only by further spreading its open mouth but also by feeding more material automatically into the loop. Fig. 2 shows the terminal portions of the member 14 partially fed from the levers so as to enlarge the loop.

Figure 4:
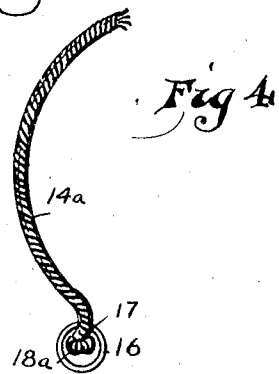

In Fig. 4 I have shown a rope or cable 14$^a$ as a gripping member. One end of it may be tied in a knot 18$^a$ to serve as a stop to prevent it from pulling out of the reel.

My invention may be used as a holder for holding or carrying glass jars or other suitably shaped objects. It may serve as a wrench for turning nuts, cylinders, rods, or the like. The member 14 may be applied to polished copper, brass, wood, or other surfaces without marring them. One tool like Fig. 1 may be used to hold an object as a fruit jar, and another tool like it or like Fig. 4 may be used at the same time to turn the fruit jar cap.

It will be noted that when the handle members 4 and 5 are brought together the pin 3 is at the vertex of a very obtuse angle formed by lines drawn from the pin 3 to the pin 15 and to the inner side of the jaw-member 10; while this arrangement of these three points does not make the pull of the member 14 on the pin 15 come in line with the pin 3, yet it approximates such a line to such an extent as to reduce very materially the force required for gripping an object. As these three points are nearly in a straight line, the force tending to open the handle members is very slight when the tool is in use. The pin 3 is also at the vertex of a very obtuse angle formed by lines drawn therefrom to the inner side of the reel and the inner side of the jaw member 12.

I do not limit my invention to the precise details and combinations shown and described, but desire to cover such modifications as come within the scope of the appended claims.

I claim:

1. In a tool, a pair of crossed levers pivoted together between their ends, a flexible looped gripping member, and means for connecting the ends of the said member to the levers, one of the said means comprising a reel carried by one of the levers and having attached thereto one end of said member, means for operating the reel, and means for locking the reel.

2. In a tool, a pair of crossed levers pivoted together between their ends, a flexible looped gripping member, and means for connecting the ends of the said member to the levers, one of the said means comprising a reel carried by one of the levers and having attached thereto one end of said member, means for operating the reel, and a releasable ratchet means permitting the reel to wind the gripping member on itself but preventing the reel from unwinding the said member.

3. In a tool, a pair of crossed levers pivoted together between their ends, a flexible looped gripping member, means for securing one end of the gripping member to one lever, and a rotatable means for adjusting the gripping member lengthwise thereof on the other lever.

4. In a tool, a pair of crossed levers pivoted together between their ends, a flexibly looped gripping member, means for securing one end of the gripping member to one lever, and means for adjusting the gripping member lengthwise thereof on the other lever, the said adjusting means comprising a hollow reel having an opening therein through which the end of the gripping member is passed, the end of the said member within the reel being larger than the said opening.

5. In a tool, a pair of crossed levers pivoted between their ends, a looped flexible gripping member having one end secured to one lever and the other end to the other lever, and means on each lever for moving laterally that portion of the loop which is adjacent to the end connected to the other lever.

6. In a tool, a pair of crossed levers pivoted together between their ends, a portion of the levers being U-shaped in cross-section, a reel rotatable in openings in opposed parts of the U-shaped part of one lever, a looped flexible member having one end connected to the reel and adapted to be wound thereon, and means for securing the remaining end of the member to the remaining lever.

7. In a tool, a pair of crossed levers pivoted between their ends and having handle members at one side of the pivot and jaws at the other side thereof, jaw members at the outer ends of the jaws, and a flexible looped gripping member having one terminal portion passed over the inner side of the jaw member of one lever and having the end of that portion attached to the other lever.

8. In a tool, a pair of crossed levers, a pivot connecting the levers between their ends, the levers having jaw members at one side of the pivot, and handle members at the other side thereof, a looped flexible member having one terminal portion passed over the jaw member of one lever and secured to the other lever on that side of the pivot where the handle members are.

9. In a tool, a pair of crossed levers pivoted between their ends, a looped flexible gripping member having the body thereof on one side of the pivot which connects the levers and the terminal portions thereof connected to the levers on the other side of the pivot, and jaw members on the ends of the levers next to the loop for opening and contracting the mouth of the loop.

Signed at Pittsburgh, Pa., this 28th day of February, 1920.

WILLIAM W. SHIRLEY.